United States Patent
Liu et al.

(10) Patent No.: US 9,521,022 B2
(45) Date of Patent: Dec. 13, 2016

(54) CYCLE-SLIP DETECTION METHOD AND APPARATUS, AND RECEIVER

(71) Applicant: Huawei Technologies Co., Ltd., Shenzhen, Guangdong (CN)

(72) Inventors: Ling Liu, Shenzhen (CN); Liangchuan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/995,855

(22) Filed: Jan. 14, 2016

(65) Prior Publication Data

US 2016/0134449 A1    May 12, 2016

Related U.S. Application Data

(63) Continuation of application No. PCT/CN2013/079403, filed on Jul. 15, 2013.

(51) Int. Cl.
| | | |
|---|---|---|
| *H04L 27/00* | (2006.01) | |
| *H04B 10/61* | (2013.01) | |
| *H04L 27/38* | (2006.01) | |

(52) U.S. Cl.
CPC ....... *H04L 27/0014* (2013.01); *H04B 10/6165* (2013.01); *H04L 27/3827* (2013.01);
(Continued)

(58) Field of Classification Search
CPC ............... H04L 7/0062; H04L 27/0014; H04L 27/2656; H04L 27/2678; H04L 27/2679; H04W 56/005
(Continued)

(56) References Cited

U.S. PATENT DOCUMENTS

| 5,790,613 A * | 8/1998 | Tateishi | ................. H04L 7/033 |
| | | | 375/317 |
| 5,854,570 A * | 12/1998 | Schmidt | ............. H04L 27/3872 |
| | | | 329/304 |

(Continued)

FOREIGN PATENT DOCUMENTS

| CN | 101334458 A | 12/2008 |
| CN | 102116867 A | 7/2011 |
| CN | 102565821 A | 7/2012 |

OTHER PUBLICATIONS

Zhang et al. "Cycle slip mitigation in POLMUX-QPSK modulation," OFC/NFOEC, IEEE 2011.*

(Continued)

*Primary Examiner* — Daniel Washburn
*Assistant Examiner* — Berhanu Tadese

(57) ABSTRACT

The present invention provides a cycle-slip detection method and apparatus, and a receiver. If an absolute value of a first difference obtained by subtracting a phase of a first symbol in a $k^{th}$ training sequence cycle from a phase of a last symbol in a $(k-1)^{th}$ training sequence cycle in a received signal is greater than a cycle-slip determining threshold, it is determined that a cycle-slip occurs in the $k^{th}$ or $(k-1)^{th}$ training sequence cycle. Further, if a second difference obtained by subtracting a phase of the first symbol in the $(k+1)^{th}$ training sequence cycle from a phase of the last symbol in the $k^{th}$ training sequence cycle is greater than the cycle-slip determining threshold, and signs of the first difference and the second difference are opposite, it is determined that a cycle-slip occurs in all symbols in the $k^{th}$ training cycle.

11 Claims, 5 Drawing Sheets

(52) U.S. Cl.
CPC ............... *H04L 2027/0046* (2013.01); *H04L 2027/0067* (2013.01); *H04L 2027/0095* (2013.01)

(58) Field of Classification Search
USPC .................................................. 375/266, 226
See application file for complete search history.

(56) References Cited

U.S. PATENT DOCUMENTS

| | | | | |
|---|---|---|---|---|
| 5,995,520 | A * | 11/1999 | Uchiki | H04L 27/22 370/204 |
| 6,256,362 | B1 * | 7/2001 | Goldman | H03D 13/004 375/373 |
| 6,392,457 | B1 * | 5/2002 | Ransijn | H03L 7/085 327/12 |
| 6,496,555 | B1 * | 12/2002 | Soda | H03L 7/087 327/156 |
| 6,973,150 | B1 * | 12/2005 | Thuringer | H03L 7/095 375/371 |
| 7,346,139 | B2 * | 3/2008 | Henrickson | H03L 7/0814 327/158 |
| 8,073,079 | B1 * | 12/2011 | Ahmed | H04L 27/2275 329/318 |
| 2002/0126787 | A1 * | 9/2002 | Homol | H03L 7/199 375/376 |
| 2003/0007585 | A1 * | 1/2003 | Dalton | H03L 7/087 375/376 |
| 2006/0280240 | A1 * | 12/2006 | Kikugawa | G11B 20/10009 375/229 |
| 2007/0024496 | A1 * | 2/2007 | Wright | G01S 19/29 342/357.68 |
| 2007/0092260 | A1 * | 4/2007 | Bontu | H04J 3/0608 398/152 |
| 2009/0147839 | A1 * | 6/2009 | Grenabo | H04L 27/0014 375/226 |
| 2009/0268857 | A1 * | 10/2009 | Chen | H04L 7/0029 375/351 |
| 2010/0138722 | A1 | 6/2010 | Harley et al. | |
| 2010/0329325 | A1 * | 12/2010 | Mobin | H04L 25/03343 375/232 |
| 2012/0051478 | A1 * | 3/2012 | Schmitt | H04L 7/0062 375/371 |
| 2012/0069942 | A1 | 3/2012 | Knutson et al. | |
| 2012/0230454 | A1 * | 9/2012 | Mobin | H04L 7/0083 375/354 |
| 2013/0024646 | A1 * | 1/2013 | Liu | G06F 17/5022 711/206 |
| 2013/0120187 | A1 | 5/2013 | Dailiwen et al. | |
| 2014/0219666 | A1 * | 8/2014 | Tselniker | H04L 25/03019 398/208 |

OTHER PUBLICATIONS

Ling Liu et al., "Cycle-slip Correction in 100Gb/s PM-QPSK Systems", Optical Society of America, Mar. 9, 2014, 3 pages.

* cited by examiner

CYCLE-SLIP DETECTION METHOD AND APPARATUS, AND RECEIVER

CROSS-REFERENCE TO RELATED APPLICATIONS

This application is a continuation of International Application No. PCT/CN2013/079403, filed Jul. 15, 2013, which is hereby incorporated by reference in its entirety.

TECHNICAL FIELD

The present invention relates to the field of mobile communications technologies, and in particular, to a cycle-slip detection method and apparatus, and a receiver.

BACKGROUND

A phase detector (phase detector) of carrier recovery circuitry (carrier recovery circuitry) has different stable points (stablepoints) Formultiple phase shift keying (Multiple Phase Shift Keying, MPSK), stable points are given on different constellation points (constellation points), where a separation between every two consecutive constellation points is $2\pi/M$, and M is a modulation order. This is generally referred to as "$2\pi/M$ phase ambiguity (phase ambiguity)". Different de-rotate (de-rotate) logic needs to be used to correct phase ambiguity and de-rotate a symbol (symbol) to a correct constellation, and de-rotated constellation points are used for forward error correction (FEC). In a carrier tracking (carrier tracking) process or an acquisition phase (acquisition phase) process, phase estimation generally fluctuates near the aforementioned stable points. If noise introduced to a carrier restore loop exceeds a threshold, phase estimation is pushed to a neighboring stable constellation point. This effect is referred to as a cycle-slip (Cycle-Slip), and because the de-rotate logic needs to follow stable points, a cycle-slip may cause an error in FEC.

At present, a structure of a conventional receiver is shown in FIG. 1, where a received signal recovers from a signal impairment after passing through an equalizer. After being equalized by the equalizer, the signal passes through a phase estimation apparatus that estimates corresponding phase noise, removes the phase noise from the equalized signal, and then performs determining. Because a constellation diagram of a transmit signal is rotation-invariant at an angle θ relative to the origin (for example, a quadrature phase shift keying (Quadrature Phase Shift Keying, QPSK) signal and a 16 quadrature amplitude modulation (Quadrature Amplitude Modulation, QAM) signal are rotation-invariant at a 90-degree angle relative to the origin), a phase φ obtained by means of signal estimation may have a slip of θ relative to an actual phase of the received signal, that is, a cycle-slip occurs. In the prior art, training sequences are often interleaved into a received signal to avoid continuous bit errors. As shown in FIG. 2, the received signal includes several training sequence cycles (including, as shown in FIG. 2, multiple training sequence cycles such as the $(k-1)^{th}$ training sequence cycle, the $k^{th}$ training sequence cycle, the $(k+1)^{th}$ training sequence cycle, and the $(k+2)^{th}$ training sequence cycle), and each training sequence cycle includes a data (Data) symbol and a training sequence (Pilot) symbol. The training sequence symbol is agreed by a sending side and a receiving side; therefore, if a cycle-slip occurs only in a training sequence symbol of a received signal, when a next training sequence symbol arrives, the receiving side may detect the cycle-slip, and then cut off continuous bit errors caused by the cycle-slip. However, if a cycle-slip occurs not only in a training sequence symbol, because content of a data symbol is unknown to the receiving side, a cycle-slip in this case is difficult to detect, and if the cycle-slip is not detected and corrected, burst continuous bit errors may occur from a position at which the cycle-slip occurs till arrival of a next training sequence symbol, which severely degrades performance of FEC.

SUMMARY

Embodiments of the present invention provide a cycle-slip detection method and apparatus, and a receiver, so as to accurately determine a position at which a cycle-slip occurs, to avoid a problem of burst continuous bit errors in a received signal caused by the cycle-slip.

According to a first aspect, an embodiment of the present invention provides a cycle-slip detection method, including:

for a received signal on which phase estimation processing has been performed, calculating a first difference by subtracting a phase of the first symbol in the $k^{th}$ training sequence cycle from a phase of the last symbol in the $(k-1)^{t}$ training sequence cycle in the received signal, and determining whether an absolute value of the first difference is greater than a set cycle-slip determining threshold, where the received signal includes several training sequence cycles, and k is an integer greater than or equal to 2; and if yes, determining that a cycle-slip occurs in the $k^{th}$ or $(k-1)^{th}$ training sequence cycle; calculating a second difference by subtracting a phase of the first symbol in the $(k+1)^{th}$ training sequence cycle from a phase of the last symbol in the $k^{th}$ training sequence cycle; and determining whether an absolute value of the second difference is greater than the set cycle-slip determining threshold, and whether plus and minus signs of the first difference and the second difference are opposite; if yes, determining that a cycle-slip occurs in all symbols in the $k^{th}$ training cycle; or if not, determining that a cycle-slip occurs in a data symbol in the $(k-1)^{th}$ training sequence cycle, and locating a position of the cycle-slip.

With reference to the first aspect, in a first possible implementation manner, the locating a position of the cycle-slip includes:

performing short-time Fourier transform or $N_{fft}$-point fast Fourier transform on a phase estimation sequence corresponding to the $(k-1)^{th}$ training sequence cycle, and use a value of the $p^{th}$ frequency as an output $L_{1-N}$ of a cycle-slip detection operator corresponding to the $(k-1)^{th}$ training sequence cycle, where N is equal to a length of each training sequence cycle; the $p^{th}$ frequency is a low frequency from which a direct current component has been removed; and the phase estimation sequence corresponding to the $(k-1)^{th}$ training sequence cycle includes phases that correspond to training sequence symbols and data symbols in the $(k-1)^{th}$ training sequence cycle;

starting from the first symbol in the $(k-1)^{th}$ training sequence cycle, sequentially comparing a cycle-slip detection operator corresponding to each symbol with a cycle-slip detection operator corresponding to a next symbol, and when it occurs for the first time that a cycle-slip detection operator corresponding to a symbol is less than a cycle-slip detection operator corresponding to a next symbol, recording the cycle-slip detection operator corresponding to the symbol as $L_{idx\_start}$; starting from the last symbol in the $(k-1)^{th}$ training sequence cycle, sequentially comparing a cycle-slip detection operator corresponding to each symbol with a cycle-slip detection operator corresponding to a previous symbol, and when it occurs for the first time that a cycle-slip detection operator corresponding to a symbol is less than a cycle-slip detection operator corresponding to a previous symbol, recording the cycle-slip detection operator corresponding to the symbol as $L_{idx\_end}$; and determining a maximum value $L_{idx}$ between $L_{idx\_start}$ and $L_{ith\_end}$, and determining that a symbol, corresponding to the maximum value $L_{idx}$, in the $(k-1)^{th}$ training sequence cycle is the position at which the cycle-slip occurs in the $(k-1)^{th}$ training sequence cycle.

With reference to the first aspect and the first possible implementation manner of the first aspect, in a second possible implementation manner, after the determining that a cycle-slip occurs in all symbols in the $k^{th}$ training cycle, the method further includes:

if the first difference is greater than 0 and the second difference is less than 0, increasing phases corresponding to all the symbols in the $k^{th}$ training sequence cycle by θ; or if the first difference is less than 0 and the second difference is greater than 0, decreasing phases corresponding to all the symbols in the $k^{th}$ training sequence cycle by θ, where θ is a cycle-slip angle corresponding to a modulation mode of the received signal.

With reference to the first possible implementation manner of the first aspect, in a third possible implementation manner, after the determining that a symbol, corresponding to the maximum value $L_{idx}$, in the $(k-1)^{th}$ training sequence cycle is the position at which the cycle-slip occurs in the $(k-1)^{th}$ training sequence cycle, the method further includes:

comparing a phase value $\phi_{k,\ idx}$ corresponding to the symbol in which the cycle-slip occurs with a phase $\phi_{k,\ idx-1}$ corresponding to a previous symbol;

if $\phi_{k,\ idx}-\phi_{k,\ idx-1}>0$, in the $(k-1)^{th}$ training sequence cycle, decreasing phases $\phi_{k,\ idx-N}$ corresponding to symbols starting from the symbol in which the cycle-slip occurs to the last symbol by θ; or if $\phi_{k,\ idx}-\phi_{k,\ idx-}<0$, in the $(k-1)^{th}$ training sequence cycle, increasing phases $\phi_{k,\ idx-N}$ correspong to symbols starting from the symbol in which the cycle-slip occurs to the last symbol by θ, where θ is a cycle-slip angle corresponding to a modulation mode of the received signal.

With reference to the first to the third possible implementation manners of the first aspect, in a fourth possible implementation manner, when the received signal uses a quadrature phase shift keying QPSK or 16 quadrature amplitude modulation QAM modulation mode, the cycle-slip determining threshold is π/4, and the cycle-slip angle θ is 90 degrees.

According to a second aspect, an embodiment of the present invention provides a cycle-slip detection apparatus, where the apparatus includes:

a calculation module, configured to: for a received signal on which phase estimation processing has been performed, calculate a first difference by subtracting a phase of the first symbol in the $k^{th}$ training sequence cycle from a phase of the last symbol in the $(k-1)^{th}$ training sequence cycle in the received signal, where the received signal includes several training sequence cycles; and when it is determined that a cycle-slip occurs in the $k^{th}$ or $(k-1)^{th}$ training sequence cycle, calculate a second difference by subtracting a phase of the first symbol in the $(k+1)^{th}$ training sequence cycle from a phase of the last symbol in the $k^{th}$ training sequence cycle, where k is an integer greater than or equal to 2;

a determining module, configured to determine whether an absolute value of the first difference is greater than a set cycle-slip determining threshold; if yes, determine that a cycle-slip occurs in the $k^{th}$ or $(k-1)^t$ training sequence cycle; and determine whether an absolute value of the second difference is greater than the set cycle-slip determining threshold, and whether plus and minus signs of the first difference and the second difference are opposite; if yes, determine that a cycle-slip occurs in all symbols in the $k^{th}$ training cycle; or if not, determine that a cycle-slip occurs in a data symbol in the $(k-1)^{th}$ training sequence cycle; and a location module, configured to: when a cycle-slip occurs in a data symbol in the $(k-1)^{th}$ training sequence cycle, locate a position of the cycle-slip.

With reference to the second aspect, in a first possible implementation manner, the location module includes:

a cycle-slip operator output submodule, configured to perform short-time Fourier transform or $N_{fft}$-point fast Fourier transform on a phase estimation sequence corresponding to the $(k-1)^{th}$ training sequence cycle, and use a value of the $p^{th}$ frequency as an output $L_{1-N}$ of a cycle-slip detection operator corresponding to the $(k-1)^{th}$ training sequence cycle, where N is equal to a length of each training sequence cycle; the $p^{th}$ frequency is a low frequency from which a direct current component has been removed; and the phase estimation sequence corresponding to the $(k-1)^{th}$ training sequence cycle includes phases that correspond to training sequence symbols and data symbols in the $(k-1)^{th}$ training sequence cycle; and a cycle-slip position location submodule, configured to: starting from the first symbol in the $(k-1)^{th}$ training sequence cycle, sequentially compare a cycle-slip detection operator corresponding to each symbol with a cycle-slip detection operator corresponding to a next symbol, and when it occurs for the first time that a cycle-slip detection operator corresponding to a symbol is less than a cycle-slip detection operator corresponding to a next symbol, record the cycle-slip detection operator corresponding to the symbol as $L_{idx\_start}$; starting from the last symbol in the $(k-1)^{th}$ training sequence cycle, sequentially compare a cycle-slip detection operator corresponding to each symbol with a cycle-slip detection operator corresponding to a previous symbol, and when it occurs for the first time that a cycle-slip detection operator corresponding to a symbol is less than a cycle-slip detection operator corresponding to a previous symbol, record the cycle-slip detection operator corresponding to the symbol as $L_{idx\_end}$; and deteLittine a maximum value $L_{idx}$ between $L_{idx\_start}$ and $L_{idx\_end}$, and determine that a symbol, corresponding to the maximum value $L_{idx}$, in the $(k-1)^{th}$ training sequence cycle is the position at which the cycle-slip occurs in the $(k-1)^{th}$ training sequence cycle.

With reference to the second aspect and the first possible implementation manner of the second aspect, in a second possible implementation manner, the cycle-slip detection apparatus further includes:

a first cycle-slip correction module, configured to: if the first difference is greater than 0 and the second difference is less than 0, increase phases corresponding to all the symbols in the $k^{th}$ training sequence cycle by θ; or if the first difference is less than 0 and the second difference is greater than 0, decrease phases corresponding to all the symbols in the $k^{th}$ training sequence cycle by θ, where θ is a cycle-slip angle corresponding to a modulation mode of the received signal.

With reference to the first possible implementation manner of the second aspect, in a third possible implementation manner, the cycle-slip detection apparatus further includes:

a second cycle-slip correction module, configured to compare a phase value $\phi_{k,\ idx}$ corresponding to the symbol in which the cycle-slip occurs with a phase $\phi_{k,\,idx-1}$ corresponding to a previous symbol; if $\phi_{k,\,idx}-\phi_{k,\,idx-}<0$, in the $(k-1)^{th}$ training sequence cycle, decrease phases $\phi_{k,\,id-N}$ corresponding to symbols starting from the symbol in which the cycle-slip occurs to the last symbol by $\theta$; or if $\phi_{k,\,idx}-\phi_{idx-1}<0$, in the $(k-1)^{th}$ training sequence cycle, increase phases $\phi_{k,\,idx-N}$ corresponding to symbols starting from the symbol in which the cycle-slip occurs to the last symbol by $\theta$, where $\theta$ is a cycle-slip angle corresponding to a modulation mode of the received signal.

According to a third aspect, an embodiment of the present invention provides a receiver, including: an equalizer, a phase estimation apparatus, and a determining apparatus, and further including the foregoing cycle-slip detection apparatus provided in the embodiments of the present invention, where a signal input end of the cycle-slip detection apparatus is connected to an output end of the phase estimation apparatus, and a signal output end of the cycle-slip detection apparatus is connected to the determining apparatus.

Beneficial effects of the embodiments of the present invention include:

According to the cycle-slip detection method and apparatus, and the receiver provided in the embodiments of the present invention, for the $k^{th}$ and $(k-1)^{th}$ training sequence cycles in a received signal on which phase estimation processing has been performed, a first difference is calculated by subtracting a phase of the first symbol in the $k^{th}$ training sequence cycle from a phase of the last symbol in the $(k-1)^{th}$ training sequence cycle; if an absolute value of the first difference is greater than a set cycle-slip determining threshold, it is determined that a cycle-slip occurs in the $k^{th}$ or $(k-1)^{th}$ training sequence cycle. Further, a second difference is calculated by subtracting a phase of the first symbol in the $(k+1)^{th}$ training sequence cycle from a phase of the last symbol in the $k^{th}$ training sequence cycle; and it is determined whether the second difference is greater than the set cycle-slip determining threshold, and whether signs of the first difference and the second difference are opposite; if yes, it is determined that a cycle-slip occurs in all symbols in the $k^{th}$ training cycle; or if not, it is determined that a cycle-slip occurs in a data symbol in the $(k-1)^{th}$ training sequence cycle, and a position of the cycle-slip is located. According to the cycle-slip detection method provided in the embodiments of the present invention, in a case in which a cycle-slip occurs not only in a training sequence symbol (including that a cycle-slip occurs in a data symbol, and a cycle-slip occurs in both a training sequence symbol and a data symbol), accurate identification and location are implemented, which facilitates correcting a cycle-slip, so as to avoid a problem of burst continuous bit errors in a received signal caused by the cycle-slip.

DETAILED DESCRIPTION

The following describes specific implementation manners of a cycle-slip detection method and apparatus, and a receiver provided in embodiments of the present invention with reference to the accompanying drawings of the specification.

Figure 1:
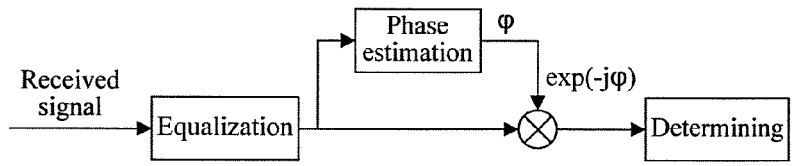
FIG. 1 is a schematic structural diagram of an existing conventional receiver.
Figure 2:
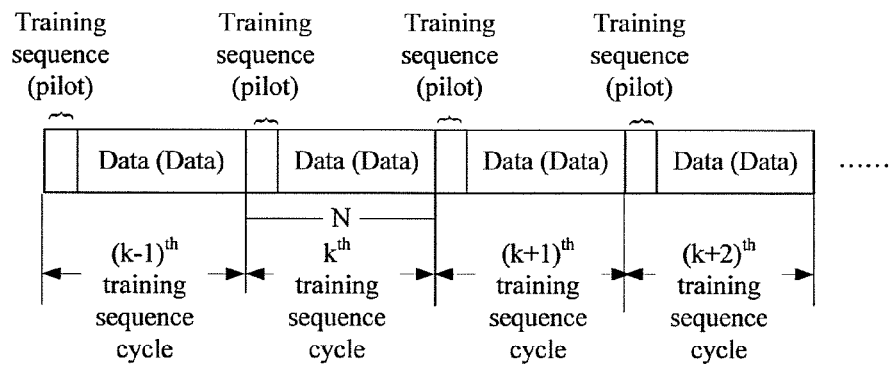
FIG. 2 is a format diagram of a received signal including several training sequence cycles.
Figure 3:
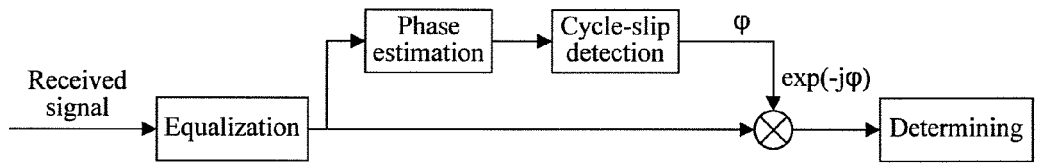
FIG. 3 is a schematic structural diagram of a receiver according to an embodiment of the present invention.

In the cycle-slip detection method provided in the embodiments of the present invention, after a phase estimation apparatus in an existing receiver sends out a signal from which phase noise has been removed, a solution of performing cycle-slip detection on a received signal is added. As shown in FIG. 3, a cycle-slip detection process depends on an output of the phase estimation apparatus, and determining is performed after the cycle-slip detection is completed. In this way, a problem of burst continuous bit errors caused by a cycle-slip can be effectively avoided.

Figure 4:
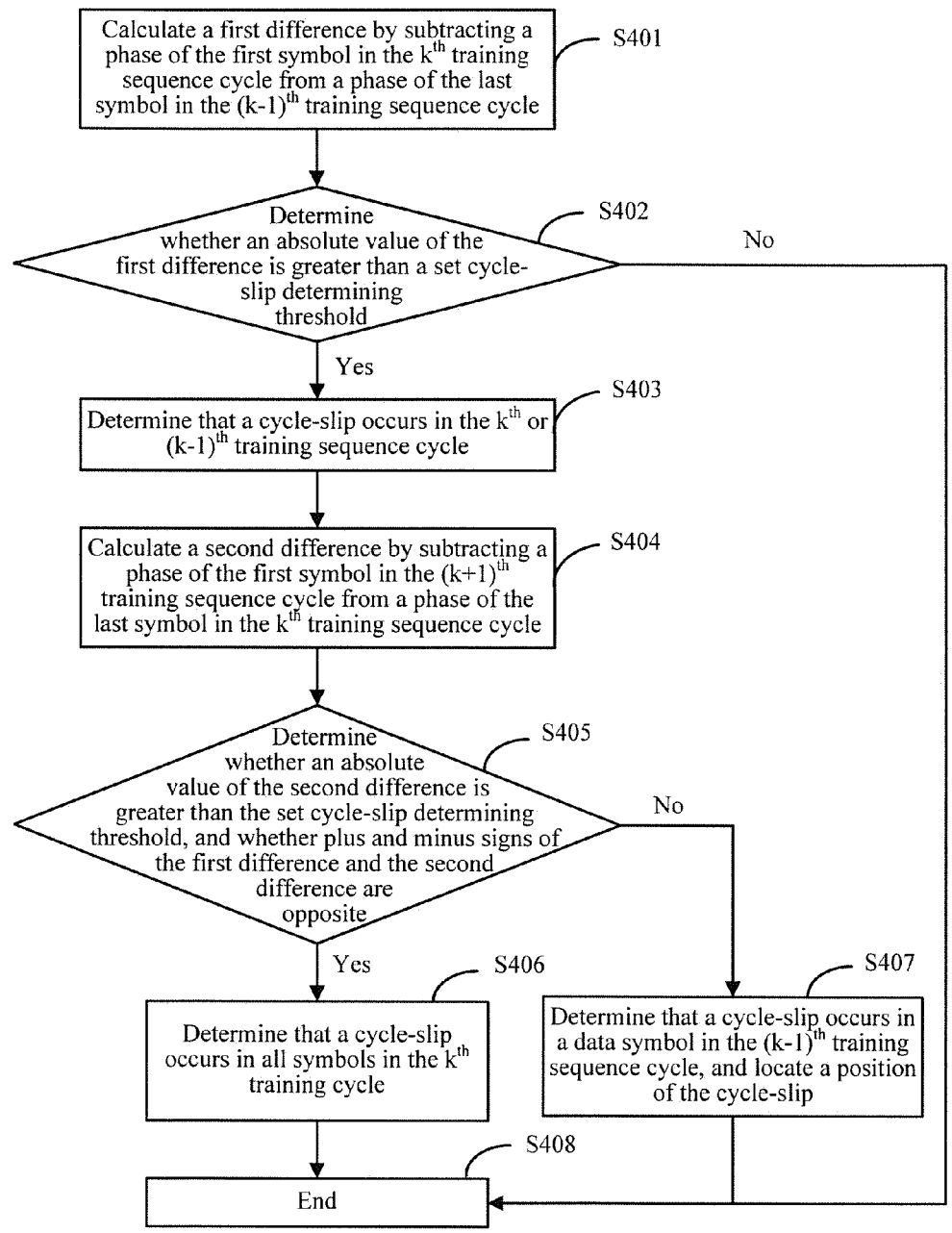
FIG. 4 is a flowchart of a cycle-slip detection method according to an embodiment of the present invention.

Specifically, as shown in FIG. 4, a cycle-slip detection method provided in this embodiment of the present invention specifically includes the following steps:

S401. For a received signal on which phase estimation processing has been performed, calculate a first difference by subtracting a phase of the first symbol in the $k^{th}$ training sequence cycle from a phase of the last symbol in the $(k-1)^{th}$ training sequence cycle, where k is an integer greater than or equal to 2, and the received signal includes several training sequence cycles.

For ease of description, it is assumed that each training sequence cycle includes N symbols (or in other words, a length of a training sequence cycle is N), and a phase (that is, an estimated phase obtained by means of phase estimation processing) corresponding to each symbol in the training sequence cycle may be represented by $\phi_{k,i}$, and is specifically represented as a phase corresponding to the $i^{th}$ symbol in the $k^{th}$ training sequence cycle; assuming that in a training sequence, M symbols are grouped into one group, i=1~M represents a phase corresponding to a training sequence symbol, and i=M+1~N represents a phase corresponding to a data symbol.

Generally, both a phase corresponding to a training sequence symbol and a phase corresponding to a data symbol are from an output of a phase estimation apparatus in a receiver (where the phase corresponding to the training sequence symbol is based on training sequence estimation, and the phase corresponding to the data symbol is based on an output of a phase retrieval algorithm), and a specific phase estimation manner belongs to the prior art, which is not described again herein.

S402: Determine whether an absolute value of the first difference is greater than a set cycle-slip determining threshold; if yes, perform the following step S403; or if not, perform the following step S408.

In step S402, a phase of the last symbol in the $(k-1)^{th}$ training sequence cycle is $\phi_{k-1,N}$, and a phase of the first symbol in the $k^{th}$ training sequence cycle is $\phi_{k,i}$, that is, it is calculated whether $|\phi_{k-1,N}-\phi_{k,i}|$ is greater than the set cycle-slip determining threshold, and if yes, it is determined that a cycle-slip occurs, and the cycle-slip may occur in the $k^{th}$ training sequence cycle or the $(k-1)^{th}$ training sequence cycle.

A cycle-slip threshold is determined according to a modulation mode of the received signal, and cycle-slip thresholds corresponding to different modulation modes may be different. For QPSK and 16QAM modulation modes, the cycle-slip threshold may be $\pi/4$.

S403. Determine that a cycle-slip occurs in the $k^{th}$ or $(k-1)^{th}$ training sequence cycle; and then further perform the following step S404.

S404. Calculate a second difference by subtracting a phase of the first symbol in the $(k+1)^{th}$ training sequence cycle from a phase of the last symbol in the $k^{th}$ training sequence cycle.

In step S404, $\phi_{k,N}-\phi_{k+1,1}$ is calculated to obtain the second difference.

S405. Determine whether an absolute value of the second difference is greater than the set cycle-slip determining threshold, and whether signs of the first difference and the second difference are opposite; if yes, go to the following step S406; or if not, go to the following step S407.

S406. Determine that a cycle-slip occurs in all symbols in the $k^{th}$ training cycle.

S407. Determine that a cycle-slip occurs in a data symbol in the $(k-1)^{th}$ training sequence cycle, and locate a position of the cycle-slip.

S408. End the process.

Preferably, in the foregoing step S407, after it is determined that a cycle-slip occurs in a data symbol in the $(k-1)^{th}$ training sequence cycle, the following solution may be used to locate a specific position of the cycle-slip:

A specific position at which the cycle-slip occurs is actually a position at which a phase corresponding to each data symbol in the $(k-1)^{th}$ training sequence cycle jump. In this embodiment of the present invention, the position at which the cycle-slip occurs may be located by means of Fourier transform. For example, a manner of short-time Fourier transform (STFT, Short-Time Fourier Transform) such as 4-point short-time Fourier transform may be used, and a value of the second frequency is used as an output $L_{1\sim N}$ of a cycle-slip detection operator, where N is equal to a length of the training sequence cycle.

Alternatively, fast Fourier transform (Fast Fourier Transform, FFT) such as $N_{fft}$-point fast Fourier transform may be used, where $N_{fft}$ is a quantity of points in fast Fourier transform, and a value of the $p^{th}$ frequency is used as an output $L_{1\sim N}$ of a cycle-slip detection operator, where the $p^{th}$ frequency may be a low frequency from which a direct current component has been removed. Preferably, for the $N_{fft}$-point fast Fourier transform, $p=N_{fft}/2$ or $(N_{fft}/2)+2$.

The output $L_{1\sim N}$ of the cycle-slip detection operator includes N values that are one-to-one corresponding to all symbols in the $(k-1)^{th}$ training sequence cycle.

Starting from the first symbol in the $(k-1)^{th}$ training sequence cycle, a cycle-slip detection operator corresponding to each symbol is sequentially compared with a cycle-slip detection operator corresponding to a next symbol, and when it occurs for the first time that a cycle-slip detection operator corresponding to a symbol is less than a cycle-slip detection operator corresponding to a next symbol, a position corresponding to the symbol is recorded as idx_start, and a corresponding cycle-slip detection operator is recorded as $L_{idx\_start}$.

Starting from the last symbol in the $(k-1)^{th}$ training sequence cycle, a cycle-slip detection operator corresponding to each symbol is sequentially compared with a cycle-slip detection operator corresponding to a previous symbol, and when it occurs for the first time that a cycle-slip detection operator corresponding to a symbol is less than a cycle-slip detection operator corresponding to a previous symbol, a position corresponding to the symbol is recorded as idx_end, and a corresponding cycle-slip detection operator is recorded as $L_{idx\_end}$.

A maximum value $L_{idx}$ between $L_{idx\_start}$ and $L_{idx\_end}$ is found in the output $L_{1\sim N}$ of the cycle-slip detection operator, and a symbol, corresponding to the maximum value, in the $(k-1)^{th}$ training sequence cycle is the position at which the cycle-slip occurs in the training sequence cycle.

The foregoing processes of determining $L_{idx\_start}$ and $L_{idx\_end}$ are independent of each other, and may be performed sequentially or may be performed simultaneously.

Further, if 4-point short-time Fourier transform is performed on a phase estimation sequence $\phi_{k-1,1\sim N}$ corresponding to the $(k-1)^{th}$ training sequence cycle, and a value of the second frequency is used as an output $L_{1\sim N}$ of the cycle-slip detection operator, phases $\phi_{k-1,1\sim N}$ corresponding to all symbols in the $(k-1)^{th}$ training sequence cycle are first arranged as a $\phi(n)$ in chronological order, where $n=N*(k-1)+i$, $i=1\sim N$, and N is a length of a training sequence cycle (that is, an interval between neighboring training sequences in the received signal). N=128 is used as an example:

When arrangement is performed in chronological order, a correspondence between $\phi_{k,i}$ and $\phi(n)$ is as follows:

$\phi(1\sim128)$ is corresponding to $\phi_{1,1\sim128}$;

$\phi(129\sim256)$ is corresponding to $\phi_{2,1\sim128}$;

$\phi(257\sim384)$ is corresponding to $\phi_{31\sim128}$;

When the value of the second frequency is used as an output of the cycle-slip detection operator, the output of the cycle-slip detection operat $L(n)=\phi(n-1)-\phi(n+1))^2+\phi(n-2)-\phi(n))^2$.

Corresponding to $\phi_{k-1,1\sim N}$, the output of the cycle-slip detection operator includes 128 values, that is, $L_{1\sim128}$, which are one-to-one corresponding to all symbols in the $(k-1)^{th}$ training sequence cycle in which the cycle-slip occurs.

According to the foregoing method provided in this embodiment of the present invention, after it is determined that a cycle-slip occurs, no matter the cycle-slip occurs in the $k^{th}$ cycle or in the $(k-1)^{th}$ cycle, a phase corresponding to a position at which the cycle-slip occurs needs to be rotated to correct the cycle-slip, and preferably, the following manner may be used to correct the cycle-slip:

After the foregoing S406, that is, after it is determined that a cycle-slip occurs in all symbols in the $k^{th}$ training cycle, if the first difference is greater than 0 and the second difference is less than 0 (that is, $\phi_{k-1,N}-\phi_{k,1}>0$, and $\phi_{k,N}-\phi_{k+1,1}<0$), phase corresponding to all the symbols in the $k^{th}$ training sequence cycle are increased by $\theta$ (that is, $\phi_{k-3\sim N}=\phi_{k,1\sim N}+\theta$).

If the first difference is less than 0 and the second difference is greater than 0 (that is, $\phi_{k-1,N}-\phi_{k,i}<0$, and $\phi_{k,N}-\phi_{k+1,1}>0$), phases corresponding to all the symbols in the $k^{th}$ training sequence cycle are decreased by $\theta$ (that is, $\phi_{k,1\sim N}-\theta$).

After the foregoing S407, that is, after it is determined that a position of a symbol corresponding to the maximum value $L_{idx}$ is the position at which the cycle-slip occurs, a phase value $\phi_{k,\ idx}$ corresponding to the symbol in which the cycle-slip occurs is compared with a phase value $\phi_{k,\ idx-1}$ corresponding to a previous symbol.

If $\phi_{k,\ idx}-\phi_{k,\ idx-1}>0$, in the $(k-1)^{th}$ training sequence cycle, phases $\phi_{k,\ idx\sim N}$ corresponding to symbols starting from the symbol in which the cycle-slip occurs to the last symbol are decreased by θ.

If $\phi_{k,\ idx}-\phi_{k,\ idx-}<0$, in the $(k-1)^{th}$ training sequence cycle, phases $\phi_{k,\ idx\sim N}$ corresponding to symbols starting from the symbol in which the cycle-slip occurs to the last symbol are increased by θ.

In the foregoing cycle-slip correction process, θ is a cycle-slip angle corresponding to a modulation mode of the received signal, and for each modulation mode, a constellation diagram of a transmit signal (which is a received signal for a signal receive end) is fixed, where the constellation diagram is rotation-invariant at an angle θ relative to the origin, and θ is the cycle-slip angle. In other words, a specific value of θ is a minimum angle by which a constellation diagram of a signal is rotated about the origin so that the constellation diagram after rotation overlaps the original constellation diagram. For example, in a case in which a signal uses a QPSK or 16QAM modulation mode, the cycle-slip angle e is 90 degrees, and in a case in which a transmit signal uses an 8PSK modulation mode, the cycle-slip angle is π/4 . Specific cycle-slip angles may be different according to different modulation modes.

With a simple process, the following describes the foregoing cycle-slip detection method provided in this embodiment of the present invention by using an example in which the received signal uses a QPSK or 16QAM modulation mode, and the cycle-slip angle θ is 90 degrees.

Figure 5:
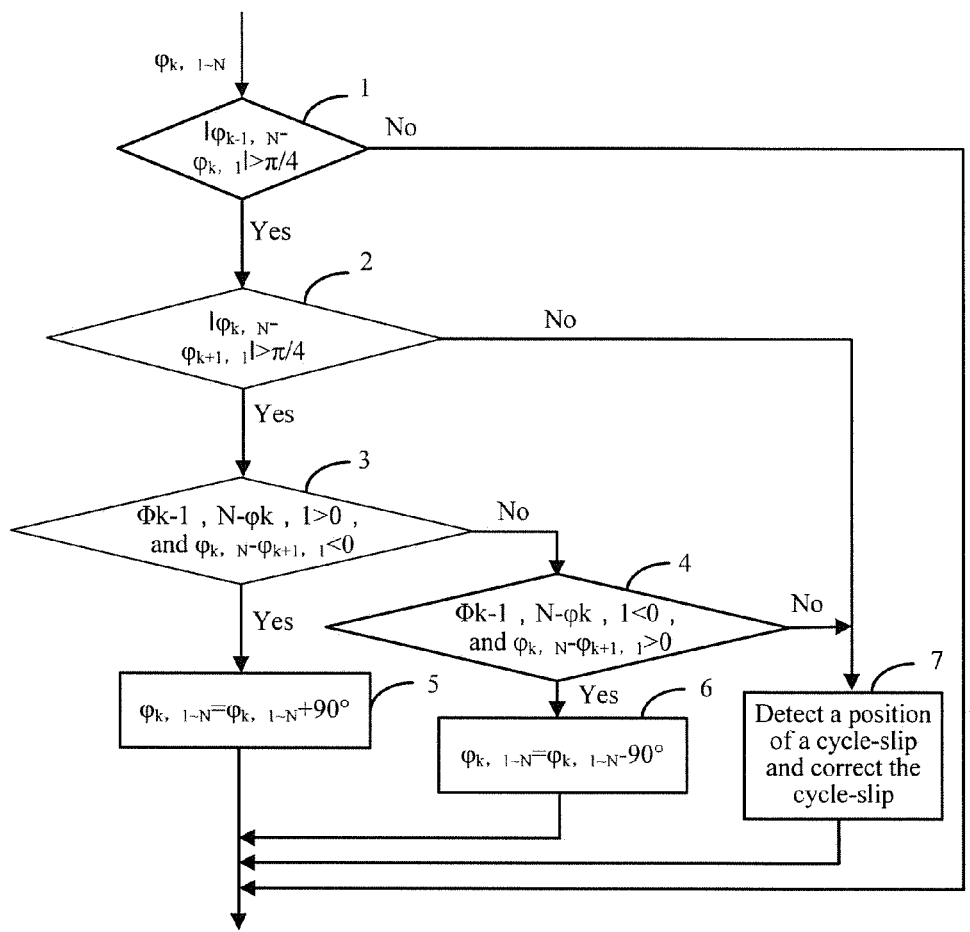
FIG. 5 is a flowchart of an instance according to an embodiment of the present invention.

As shown in FIG. 5, the process includes:

Step 1: When the $k^{th}$ training sequence cycle arrives, compare $\phi_{k-1,N}$ and $\phi_{k,i}$, and if $$|\varphi_{k-1,N} - \varphi_{k,1}| > \frac{\pi}{4},$$

determine that a cycle-slip occurs;

otherwise, determine that no cycle-slip occurs, where if it is determined that a cycle-slip occurs, the cycle-slip may occur in the $(k-1)^{th}$ training sequence cycle, or the $k^{th}$ training sequence cycle.

Step 2: If it is determined that $$|\varphi_{k-1,N} - \varphi_{k,1}| > \frac{\pi}{4},$$

continue to compare $\phi_{k,N}$ and $\phi_{k+1,1}$ and if $$|\varphi_{k,N} - \varphi_{k+1,1}| > \frac{\pi}{4}$$

perform the following step 3; otherwise, perform the following step 7.

Step 3: Next, determine whether $(\phi_{k-1,N}-\phi_{k,i})$ and $(\phi_{k,N}-\phi_{k+1,1})$ meet: $(\phi_{k-1,N}-\phi_{k,i})>0$ $(\phi_{k,N}-\phi_{k+1,1})>0$, and if yes, perform step 5; otherwise go to step 4.

Step 4: Next, determine whether $(\phi_{k-1,N}-\phi_{k,i})$ and $(\phi_{k,N}-\phi_{k+1,1})$ meet: $(\phi_{k-1,N}-\phi_{k,i})$ and $(\phi_{k,N}-\phi_{k+1,1})>0$, and if yes, peform step 5; otherwise go to step 7.

Step 5: Increase $\phi_{k,1-N}$ by 90 degrees, that is, $\phi_{k,1-N}=\phi_{k,1-N}+90°$.

Step 6: Decrease $\phi_{k,1-N}$ by 90 degrees, that is, $\phi_{k,1-N}=\phi_{k,1-N}-90°$.

Step 7: Detect a position of the cycle-slip in the $(k-1)^{th}$ cycle, and correct the cycle-slip.

Actually, in the foregoing step 3 and step 4, it is already determined that a cycle-slip occurs in all symbols in the $k^{th}$ training sequence cycle.

In the foregoing step 7, the method for detecting the position of the cycle-slip in the $(k-1)^{th}$ cycle and correcting the cycle-slip has been described in detail above, and is not described herein again.

Based on the same invention concept, an embodiment of the present invention further provides a cycle-slip detection apparatus and a receiver. Principles of the apparatus and the receiver for solving the problem are similar to that of the foregoing cycle-slip detection method; therefore, for implementation of the apparatus and the receiver, reference may be made to the implementation of the foregoing method, and repeated parts are not described again.

Figure 6:
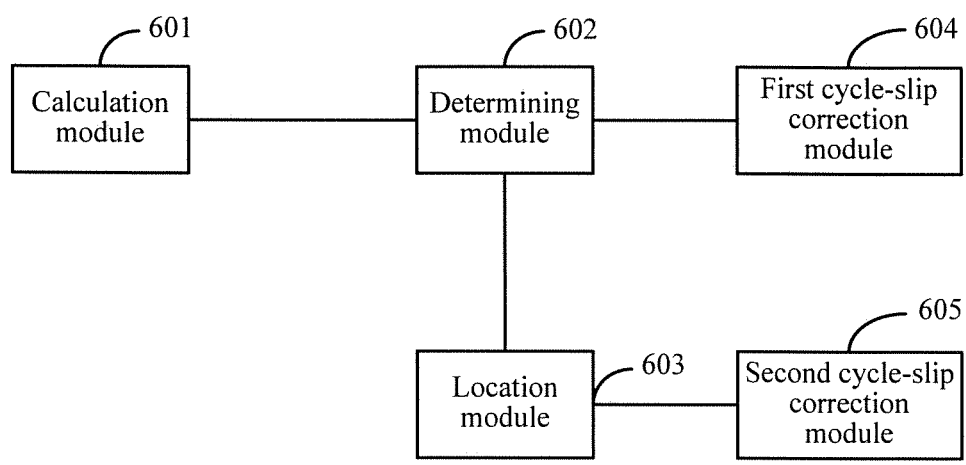
FIG. 6 is a first schematic structural diagram of a cycle-slip detection apparatus according to an embodiment of the present invention.

As shown in FIG. 6, a first possible implementation manner of the cycle-slip detection apparatus provided in this embodiment of the present invention includes:

a calculation module 601, configured to: for a received signal on which phase estimation processing has been performed, calculate a first difference by subtracting a phase of the first symbol in the $k^{th}$ training sequence cycle from a phase of the last symbol in the $(k-1)^{th}$ training sequence cycle in the received signal, where the received signal includes several training sequence cycles; and when it is determined that a cycle-slip occurs in the $k^{th}$ or $(k-1)^{th}$ training sequence cycle, calculate a second difference by subtracting a phase of the first symbol in the $(k+1)^{th}$ training sequence cycle from a phase of the last symbol in the $k^{th}$ training sequence cycle, where k is an integer greater than or equal to 2;

a determining module 602, configured to determine whether an absolute value of the first difference is greater than a set cycle-slip determining threshold; if yes, determine that a cycle-slip occurs in the $k^{th}$ or $(k-1)^{th}$ training sequence cycle; and determine whether an absolute value of the second difference is greater than the set cycle-slip determining threshold, and whether signs of the first difference and the second difference are opposite; if yes, determine that a cycle-slip occurs in all symbols in the $k^{th}$ training cycle; or if not, determine that a cycle-slip occurs in a data symbol in the $(k-1)^{th}$ training sequence cycle; and a location module 603, configured to: when a cycle-slip occurs in a data symbol in the $(k-1)^{th}$ training sequence cycle, locate a position of the cycle-slip.

Figure 7:
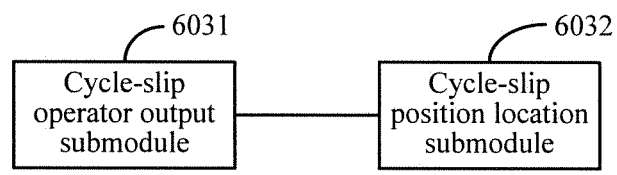
FIG. 7 is a schematic structural diagram of a location module according to an embodiment of the present invention.

Further, as shown in FIG. 7, the foregoing location module 603 includes:

a cycle-slip operator output submodule 6031, configured to perform short-time Fourier transform or $N_{fft}$-point fast Fourier transform on a phase estimation sequence corresponding to the $(k-1)^{th}$ training sequence cycle, and use a value of the $p^{th}$ frequency as an output $L_{1\sim N}$ of a cycle-slip detection operator corresponding to the $(k-1)^{th}$ training sequence cycle, where N is equal to a length of each training sequence cycle; the $p^{th}$ frequency is a low frequency from which a direct current component has been removed; and the phase estimation sequence corresponding to the $(k-1)^{th}$ training sequence cycle includes phases that correspond to training sequence symbols and data symbols in the $(k-1)^{th}$ training sequence cycle; and a cycle-slip position location submodule 6032, configured to: starting from the first symbol in the $(k-1)^{th}$ training sequence cycle, sequentially compare a cycle-slip detection operator corresponding to each symbol with a cycle-slip detection operator corresponding to a next symbol, and when it occurs for the first time that a cycle-slip detection operator corresponding to a symbol is less than a cycle-slip detection operator corresponding to a next symbol, record the cycle-slip detection operator corresponding to the symbol as $L_{idx\_start}$; starting from the last symbol in the $(k-1)^{th}$ training sequence cycle, sequentially compare a cycle-slip detection operator corresponding to each symbol with a cycle-slip detection operator corresponding to a previous symbol, and when it occurs for the first time that a cycle-slip detection operator corresponding to a symbol is less than a cycle-slip detection operator corresponding to a previous symbol, record the cycle-slip detection operator corresponding to the symbol as $L_{idx\_end}$; and determine a maximum value $L_{idx}$ between $L_{idx\_start}$ and $L_{idx\_end}$, and determine that a symbol, corresponding to the maximum value $L_{idx}$, in the $(k-1)^{th}$ training sequence cycle is the position at which the cycle-slip occurs in the $(k-1)^{th}$ training sequence cycle.

Further, the cycle-slip output submodule 6032 is specifically configured to perform 4-point short-time Fourier transform on a phase estimation sequence $\phi_{k-1,1\sim N}$ corresponding to the $(k-1)^{th}$ training sequence cycle, and use a value of the second frequency as an output $L_{1\sim N}$ of the cycle-slip detection operator, where $L(n)=(\phi(n-1)-\phi(n+1))^2+(\phi(n-2)-\phi(n))^2$, and $\phi(n)$ is obtained by arranging the phase estimation sequence $\phi_{k-1,1\sim N}$ in chronological order, where $n=N*(k-1)+i$, $i=1\sim N$, and N is a length of each training sequence cycle.

Further, as shown in FIG. 6, the cycle-slip detection apparatus further includes: a first cycle-slip correction module 604, configured to : if the first difference is greater than 0 and the second difference is less than 0, increase phases corresponding to all the symbols in the $k^{th}$ training sequence cycle by θ; or if the first difference is less than 0 and the second difference is greater than 0, decrease phases corresponding to all the symbols in the $k^{th}$ training sequence cycle by θ, where θ is a cycle-slip angle corresponding to a modulation mode of the received signal.

Further, as shown in FIG. 6, the cycle-slip detection apparatus further includes: a second cycle-slip correction module 605, configured to compare a phase value $\phi_{k,\ idx}$ corresponding to the symbol in which the cycle-slip occurs with a phase $\phi_{k,\ idx-1}$ corresponding to a previous symbol; if $\phi_{k,\ idx}-\phi_{k,\ idx}>0$, in the $(k-1)^{th}$ training sequence cycle, decrease phases $\phi_{k,\ idx\sim N}$ corresponding to symbols starting from the symbol in which the cycle-slip occurs to the last symbol by θ; or if $\phi_{k,\ idx}-\phi_{idx-}<0$, in the $(k-1)^{th}$ training sequence cycle, increase phases $\phi_{k,\ idx\sim N}$ corresponding to symbols starting from the symbol in which the cycle-slip occurs to the last symbol by θ, where θ is a cycle-slip angle corresponding to a modulation mode of the received signal.

Figure 8:
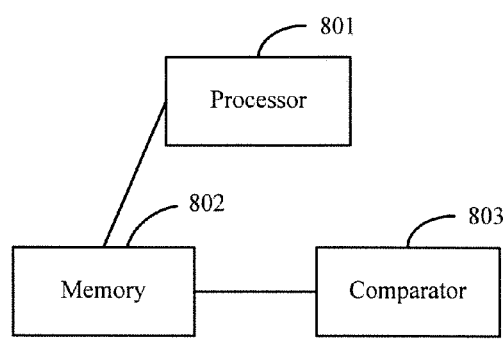
FIG. 8 is a second schematic structural diagram of a cycle-slip detection apparatus according to an embodiment of the present invention.

As shown in FIG. 8, a second possible implementation manner of the cycle-slip detection apparatus provided in this embodiment of the present invention includes:

a processor 801, configured to: for a received signal on which phase estimation processing has been performed, calculate a first difference by subtracting a phase of the first symbol in the $k^{th}$ training sequence cycle from a phase of the last symbol in the $(k-1)^{th}$ training sequence cycle in the received signal, where the received signal includes several training sequence cycles; when it is determined that a cycle-slip occurs in the $k^{th}$ or $(k-1)^{th}$ training sequence cycle, calculate a second difference by subtracting a phase of the first symbol in the $(k+1)^{th}$ training sequence cycle from a phase of the last symbol in the $k^{th}$ training sequence cycle, where k is an integer greater than or equal to 2; if an absolute value of the first difference is greater than a set cycle-slip determining threshold, determine that a cycle-slip occurs in the $k^{th}$ or $(k-1)^{th}$ training sequence cycle; if an absolute value of the second difference is greater than the set cycle-slip determining threshold, and signs of the first difference and the second difference are opposite, determine that a cycle-slip occurs in all symbols in the $k^{th}$ training cycle; or if not, determine that a cycle-slip occurs in a data symbol in the $(k-1)^{th}$ training sequence cycle;

a memory 802, configured to store the first difference and the second difference that are obtained through calculation; and a comparator 803, configured to determine whether the absolute value of the first difference is greater than the set cycle-slip determining threshold; and determine whether the absolute value of the second difference is greater than the set cycle-slip determining threshold, and whether plus and minus signs of the first difference and the second difference are opposite.

Figure 9:
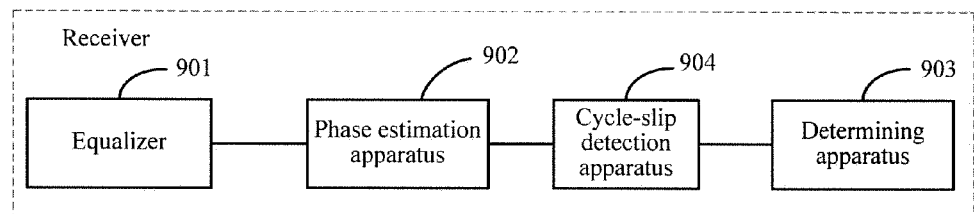
FIG. 9 is a schematic structural diagram of a receiver according to an embodiment of the present invention.

As shown in FIG. 9, an embodiment of the present invention further provides a receiver, including: an equalizer 901, a phase estimation apparatus 902, a determining apparatus 903, and the foregoing cycle-slip detection apparatus 904 provided in the embodiments of the present invention, where a signal input end of the cycle-slip detection apparatus 904 is connected to an output end of the phase estimation apparatus 902, and a signal output end of the cycle-slip detection apparatus 904 is connected to the determining apparatus 903. Functions of and mutual connection structures among the equalizer 901, the phase estimation apparatus 902, and the determining apparatus 903 are the same as those in the prior art, and are not described again herein According to the cycle-slip detection method and apparatus, and the receiver provided in the embodiments of the present invention, for the $k^{th}$ and $(k-1)^{th}$ training sequence cycles in a received signal on which phase estimation processing has been performed, a first difference is calculated by subtracting a phase of the first symbol in the $k^{th}$ training sequence cycle from a phase of the last symbol in the $(k-1)^{th}$ training sequence cycle; if an absolute value of the first difference is greater than a set cycle-slip determining threshold, it is determined that a cycle-slip occurs in the $k^{th}$ or $(k-1)^{th}$ training sequence cycle. Further, a second difference is calculated by subtracting a phase of the first symbol in the $(k+1)^{th}$ training sequence cycle from a phase of the last symbol in the $k^{th}$ training sequence cycle; and it is determined whether the second difference is greater than the set cycle-slip determining threshold, and whether signs of the first difference and the second difference are opposite; if yes, it is determined that a cycle-slip occurs in all symbols in the $k^{th}$ training cycle; or if not, it is determined that a cycle-slip occurs in a data symbol in the $(k-1)^{th}$ training sequence cycle, and a position of the cycle-slip is located. According to the cycle-slip detection method provided in the embodiments of the present invention, in a case (including that a cycle-slip occurs in a data symbol, and a cycle-slip occurs in both a training sequence symbol and a data symbol) in which a cycle-slip occurs not only in a training sequence symbol in a received signal, accurate identification and location are implemented, which facilitates correcting a cycle-slip, so as to avoid a problem of burst continuous bit errors in a received signal caused by the cycle-slip.

According to the description of the foregoing implementation manners, a person skilled in the art may clearly understood that the embodiments of the present invention may be implemented by hardware, or may be implemented in a manner of software plus a necessary universal hardware platform. Based on such an understanding, the technical solutions of the embodiments of the present invention may be expressed in a form of a software product, where the software product may be stored in a non-volatile storage medium (which may be a CD-ROM, a USB flash disk, a removable hard disk, or the like), and include several instructions for making a computer device (which may be a personal computer, a server, a network device, or the like) to execute the method of the embodiments of the present invention.

A person skilled in the art may understand that the accompanying drawings are merely schematic diagrams of exemplary embodiments, and modules or processes in the accompanying drawings are not necessarily required for implementing the present invention.

A person skilled in the art may understand that the modules in the apparatuses provided in the embodiments may be arranged in the apparatuses in a distributed manner according to the description of the embodiments, or may be arranged in one or more apparatuses that are different from those described in the embodiments. The modules in the foregoing embodiments maybe combined into one module, or split into a plurality of submodules.

The sequence numbers of the foregoing embodiments of the present invention are merely for illustrative purposes, and are not intended to indicate priorities of the embodiments.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A cycle-slip detection method, comprising:
   for a received signal on which phase estimation processing has been performed, calculating a first difference by subtracting a phase of a first symbol in a $k^{th}$ training sequence cycle from a phase of a last symbol in a $(k-1)^{th}$ training sequence cycle in the received signal, and determining whether an absolute value of the first difference is greater than a set cycle-slip determining threshold, wherein the received signal comprises several training sequence cycles, and k is an integer greater than or equal to 2;
   in response to the absolute value of the first difference being greater than the set cycle-slip determining threshold:
      determining that a cycle-slip occurs in the $k^{th}$ or $(k-1)^{th}$ training sequence cycle;
      calculating a second difference by subtracting a phase of the first symbol in the $(k+1)^{th}$ training sequence cycle from a phase of the last symbol in the $k^{th}$ training sequence cycle; and
      determining whether an absolute value of the second difference is greater than the set cycle-slip determining threshold, and whether plus and minus signs of the first difference and the second difference are opposite;
   in response to the absolute value of the second difference being greater than the set cycle-slip determining threshold, and in response to the plus and minus signs of the first difference and the second difference being opposite:
      determining that a cycle-slip occurs in all symbols in the $k^{th}$ training cycle; and
   in response to the absolute value of the second difference not being greater than the set cycle-slip determining threshold, or in response to the plus and minus signs of the first difference and the second difference not being opposite:
      determining that a cycle-slip occurs in a data symbol in the $(k-1)^{th}$ training sequence cycle, and locating a position of the cycle-slip.

2. The method according to claim 1, wherein locating a position of the cycle-slip comprises:
   performing short-time Fourier transform or $N_{fft}$-point fast Fourier transform on a phase estimation sequence corresponding to the $(k-1)^{th}$ training sequence cycle, and using a value of the $p^{th}$ frequency as an output $L^{1\sim N}$ of a cycle-slip detection operator corresponding to the $(k-1)^{th}$ training sequence cycle, wherein N is equal to a length of each training sequence cycle; the $p^{th}$ frequency is a low frequency from which a direct current component has been removed; and the phase estimation sequence corresponding to the $(k-1)^{th}$ training sequence cycle comprises phases that correspond to training sequence symbols and data symbols in the $(k-1)^{th}$ training sequence cycle;
   starting from the first symbol in the $(k-1)^{th}$ training sequence cycle, sequentially comparing a cycle-slip detection operator corresponding to each symbol with a cycle-slip detection operator corresponding to a next symbol, and when it occurs for the first time that a cycle-slip detection operator corresponding to a symbol is less than a cycle-slip detection operator corresponding to a next symbol, recording the cycle-slip detection operator corresponding to the symbol as $L_{idx\_start}$;
   starting from the last symbol in the $(k-1)^{th}$ training sequence cycle, sequentially comparing a cycle-slip detection operator corresponding to each symbol with a cycle-slip detection operator corresponding to a previous symbol, and when it occurs for the first time that a cycle-slip detection operator corresponding to a symbol is less than a cycle-slip detection operator corresponding to a previous symbol, recording the cycle-slip detection operator corresponding to the symbol as $L_{idx\_end}$; and
   determining a maximum value $L_{idx}$ between $L_{idx\_start}$ and $L_{idx\_end}$, and determining that a symbol, corresponding to the maximum value $L_{idx}$, in the $(k-1)^{th}$ training sequence cycle is the position at which the cycle-slip occurs in the $(k-1)^{th}$ training sequence cycle.

3. The method according to claim 1, wherein after determining that a cycle-slip occurs in all symbols in the $k^{th}$ training cycle, the method further comprises:
   if the first difference is greater than 0 and the second difference is less than 0, increasing phases corresponding to all the symbols in the $k^{th}$ training sequence cycle by θ; or
   if the first difference is less than 0 and the second difference is greater than 0, decreasing phases corresponding to all the symbols in the $k^{th}$ training sequence cycle by θ; and
   wherein θ is a cycle-slip angle corresponding to a modulation mode of the received signal.

4. The method according to claim 2, wherein after determining that a symbol, corresponding to the maximum value $L_{idx}$, in the $(k-1)^{th}$ training sequence cycle is the position at which the cycle-slip occurs in the $(k-1)^{th}$ training sequence cycle, the method further comprises:

comparing a phase value $\phi_{k,\ idx}$ corresponding to the symbol in which the cycle-slip occurs with a phase $\phi_{k,\ idx-1}$ corresponding to a previous symbol; and if $\phi_{k,\ idx}-\phi_{k,\ idx-1}>0$, in the $(k-1)^{th}$ training sequence cycle, decreasing phases $\phi_{k,\ idx\sim N}$ corresponding to symbols starting from the symbol in which the cycle-slip occurs to the last symbol by $\theta$; or if $\phi_{k,\ idx}-\phi k,\ idx-1<0$, in the $(k-1)^{th}$ training sequence cycle, increasing phases $\phi^{k,\ idx\sim N}$ corresponding to symbols starting from the symbol in which the cycle-slip occurs to the last symbol by $\theta$; and wherein $\theta$ is a cycle-slip angle corresponding to a modulation mode of the received signal.

5. The method according to claim 1, wherein when the received signal uses a quadrature phase shift keying (QPSK) or 16 quadrature amplitude modulation (QAM) modulation mode, the cycle-slip determining threshold is $\pi/4$, and the cycle-slip angle $\theta$ is 90 degrees.

6. A cycle-slip detection apparatus, comprising:
a calculation module, configured to:
for a received signal on which phase estimation processing has been performed, calculate a first difference by subtracting a phase of a first symbol in a $k^{th}$ training sequence cycle from a phase of a last symbol in a $(k-1)^{th}$ training sequence cycle in the received signal, wherein the received signal comprises several training sequence cycles, and
when it is determined that a cycle-slip occurs in the $k^{th}$ or $(k-1)^{th}$ training sequence cycle, calculate a second difference by subtracting a phase of the first symbol in the $(k+1)^{th}$ training sequence cycle from a phase of the last symbol in the $k^{th}$ training sequence cycle, wherein k is an integer greater than or equal to 2;
a determining module, configured to:
determine whether an absolute value of the first difference is greater than a set cycle-slip determining threshold;
in response to the absolute value of the first difference being greater than the set cycle-slip determining threshold:
determine that a cycle-slip occurs in the $k^{th}$ or $(k-1)^{th}$ training sequence cycle; and
determine whether an absolute value of the second difference is greater than the set cycle-slip determining threshold, and whether plus and minus signs of the first difference and the second difference are opposite;
in response to the absolute value of the second difference being greater than the set cycle-slip determining threshold, and in response to the plus and minus signs of the first difference and the second difference being opposite:
determine that a cycle-slip occurs in all symbols in the $k^{th}$ training cycle; and
in response to the absolute value of the second difference not being greater than the set cycle-slip determining threshold, or in response to the plus and minus signs of the first difference and the second difference not being opposite:
determine that a cycle-slip occurs in a data symbol in the $(k-1)^{th}$ training sequence cycle; and
a location module, configured to:
when a cycle-slip occurs in a data symbol in the $(k-1)^{th}$ training sequence cycle, locate a position of the cycle-slip.

7. The apparatus according to claim 6, wherein the location module comprises:
a cycle-slip operator output submodule, configured to perform short-time Fourier transform or $N_{fft}$-point fast Fourier transform on a phase estimation sequence corresponding to the $(k-1)^{th}$ training sequence cycle, and use a value of the $p^{th}$ frequency as an output $L_{1\sim N}$ of a cycle-slip detection operator corresponding to the $(k-1)^{th}$ training sequence cycle, wherein N is equal to a length of each training sequence cycle, the $p^{th}$ frequency is a low frequency from which a direct current component has been removed, and the phase estimation sequence corresponding to the $(k-1)^{th}$ training sequence cycle comprises phases that correspond to training sequence symbols and data symbols in the $(k-1)^{th}$ training sequence cycle; and
a cycle-slip position location submodule, configured to:
starting from the first symbol in the $(k-1)^{th}$ training sequence cycle, sequentially compare a cycle-slip detection operator corresponding to each symbol with a cycle-slip detection operator corresponding to a next symbol, and when it occurs for the first time that a cycle-slip detection operator corresponding to a symbol is less than a cycle-slip detection operator corresponding to a next symbol, record the cycle-slip detection operator corresponding to the symbol as $L_{idx\_start}$; starting from the last symbol in the $(k-1)^{th}$ training sequence cycle, sequentially compare a cycle-slip detection operator corresponding to each symbol with a cycle-slip detection operator corresponding to a previous symbol, and when it occurs for the first time that a cycle-slip detection operator corresponding to a symbol is less than a cycle-slip detection operator corresponding to a previous symbol, record the cycle-slip detection operator corresponding to the symbol as $L_{idx\_end}$; and determine a maximum value $L_{idx}$ between $L_{idx\_start}$ and $L_{idx\_end}$, and determine that a symbol, corresponding to the maximum value $L_{idx}$, in the $(k-1)^{th}$ training sequence cycle is the position at which the cycle-slip occurs in the $(k-1)^{th}$ training sequence cycle.

8. The apparatus according to claim 6, further comprising a first cycle-slip correction module, configured to:
if the first difference is greater than 0 and the second difference is less than 0, increase phases corresponding to all the symbols in the $k^{th}$ training sequence cycle by $\theta$; or
if the first difference is less than 0 and the second difference is greater than 0, decrease phases corresponding to all the symbols in the $k^{th}$ training sequence cycle by $\theta$; and
wherein $\theta$ is a cycle-slip angle corresponding to a modulation mode of the received signal.

9. The apparatus according to claim 7, further comprising a second cycle-slip correction module, configured to:
compare a phase value $\phi_{k,\ idx}$ corresponding to the symbol in which the cycle-slip occurs with a phase $\phi_{k,\ idx-1}$ corresponding to a previous symbol; and
if $\phi_{k,\ idx}-\phi_{k,\ idx-1}>0$, in the $(k-1)^{th}$ training sequence cycle, decrease phases $\phi_{k,\ idx\sim N}$ corresponding to symbols starting from the symbol in which the cycle-slip occurs to the last symbol by $\theta$; or
if $\phi_{k,\ idx}-\phi_{k,\ idx-1}<0$, in the $(k-1)^{th}$ training sequence cycle, increase phases $\phi_{k,\ idx\sim N}$ corresponding to symbols starting from the symbol in which the cycle-slip occurs to the last symbol by $\theta$; and wherein θ is a cycle-slip angle corresponding to a modulation mode of the received signal.

10. A cycle-slip detection apparatus comprising:
a non-transitory memory; and
a processor coupled to the memory and configured with processor-executable instructions to perform the following:
for a received signal on which phase estimation processing has been performed, calculating a first difference by subtracting a phase of a first symbol in a $k^{th}$ training sequence cycle from a phase of a last symbol in a $(k-1)^{th}$ training sequence cycle in the received signal, and determining whether an absolute value of the first difference is greater than a set cycle-slip determining threshold, wherein the received signal comprises several training sequence cycles, and k is an integer greater than or equal to 2;
in response to the absolute value of the first difference being greater than the set cycle-slip determining threshold:
determining that a cycle-slip occurs in the $k^{th}$ or $(k-1)^{th}$ training sequence cycle;
calculating a second difference by subtracting a phase of the first symbol in the $(k+1)^{th}$ training sequence cycle from a phase of the last symbol in the $k^{th}$ training sequence cycle; and
determining whether an absolute value of the second difference is greater than the set cycle-slip determining threshold, and whether plus and minus signs of the first difference and the second difference are opposite;
in response to the absolute value of the second difference being greater than the set cycle-slip determining threshold, and in response to the plus and minus signs of the first difference and the second difference being opposite:
determining that a cycle-slip occurs in all symbols in the $k^{th}$ training cycle; and
in response to the absolute value of the second difference not being greater than the set cycle-slip determining threshold, or in response to the plus and minus signs of the first difference and the second difference not being opposite:
determining that a cycle-slip occurs in a data symbol in the $(k-1)^{th}$ training sequence cycle, and locating a position of the cycle-slip.

11. The apparatus according to claim 10, wherein the processor is configured with processor-executable instructions to perform the following:
performing short-time Fourier transform or $N_{fft}$-point fast Fourier transform on a phase estimation sequence corresponding to the $(k-1)^{th}$ training sequence cycle, and using a value of the $p^{th}$ frequency as an output $L_{1\sim N}$ of a cycle-slip detection operator corresponding to the $(k-1)^{th}$ training sequence cycle, wherein N is equal to a length of each training sequence cycle; the $p^{th}$ frequency is a low frequency from which a direct current component has been removed; and the phase estimation sequence corresponding to the $(k-1)^{th}$ training sequence cycle comprises phases that correspond to training sequence symbols and data symbols in the $(k-1)^{th}$ training sequence cycle;
starting from the first symbol in the $(k-1)^{th}$ training sequence cycle, sequentially comparing a cycle-slip detection operator corresponding to each symbol with a cycle-slip detection operator corresponding to a next symbol, and when it occurs for the first time that a cycle-slip detection operator corresponding to a symbol is less than a cycle-slip detection operator corresponding to a next symbol, recording the cycle-slip detection operator corresponding to the symbol as $L_{idx\_start}$;
starting from the last symbol in the $(k-1)^{th}$ training sequence cycle, sequentially comparing a cycle-slip detection operator corresponding to each symbol with a cycle-slip detection operator corresponding to a previous symbol, and when it occurs for the first time that a cycle-slip detection operator corresponding to a symbol is less than a cycle-slip detection operator corresponding to a previous symbol, recording the cycle-slip detection operator corresponding to the symbol as $L_{idx\_end}$; and
determining a maximum value $L_{idx}$ between $L_{idx\_start}$ and $L_{idx\_end}$, and determining that a symbol, corresponding to the maximum value $L_{idx}$, in the $(k-1)^{th}$ training sequence cycle is the position at which the cycle-slip occurs in the $(k-1)^{th}$ training sequence cycle.

* * * * *